(12) United States Patent
Monden et al.

(10) Patent No.: US 8,188,382 B2
(45) Date of Patent: May 29, 2012

(54) LEADTHROUGH FOR PASSING CONDUITS THROUGH CONSTRUCTIONAL COMPONENTS

(75) Inventors: Thomas Monden, Stetten (DE);
Christian Viermann, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 542 days.

(21) Appl. No.: 12/380,569

(22) Filed: Feb. 26, 2009

(65) Prior Publication Data

US 2009/0218130 A1 Sep. 3, 2009

(30) Foreign Application Priority Data

Feb. 27, 2008 (DE) .......................... 10 2008 000 420

(51) Int. Cl.
*H02G 3/22* (2006.01)
*H02G 3/04* (2006.01)
(52) U.S. Cl. ...... 174/505; 174/68.1; 174/68.3; 174/70 C
(58) Field of Classification Search .................. 174/505, 174/58, 68.1, 68.3, 70 C; 52/220.1, 220.3, 52/220.8, 232, 219
See application file for complete search history.

(56) References Cited

U.S. PATENT DOCUMENTS

| 3,881,752 | A  | * | 5/1975  | Fujishima ........................ 285/46 |
| 6,405,502 | B1 | * | 6/2002  | Cornwall ..................... 52/220.8 |
| 6,426,463 | B2 | * | 7/2002  | Munzenberger et al. ... 174/77 R |
| 6,694,684 | B2 | * | 2/2004  | Radke et al. .................... 52/232 |
| 7,080,486 | B2 | * | 7/2006  | Radke et al. ....................... 52/98 |
| 7,152,385 | B2 | * | 12/2006 | Morgan et al. ............. 52/745.05 |
| 2007/0283644 | A1 | * | 12/2007 | Fischer et al. ............... 52/288.1 |

* cited by examiner

*Primary Examiner* — Quyen Leung
*Assistant Examiner* — Thomas Truong
(74) *Attorney, Agent, or Firm* — Abelman, Frayne & Schwab

(57) ABSTRACT

A leadthrough for passing conduits (6) through a constructional component (5) includes a circumferentially closed housing (12), an insert (21) of intumescent material located in the housing (12), and a first and second diaphragm-shaped sealing members (31, 36) formed, respectively, of an elastic material, and a textile flat material, each having a through-opening (32, 37) and both located in the housing (12), with the second sealing member (36) having a transition temperature of at least 600° C.

8 Claims, 2 Drawing Sheets

LEADTHROUGH FOR PASSING CONDUITS THROUGH CONSTRUCTIONAL COMPONENTS

BACKGROUND OF THE INVENTION

1. Field of the Invention

The present invention relates to a leadthrough for passing conduits through a constructional component and including a circumferentially closed housing that surrounds a pass-through space for a conduit, an insert of intumescent material located in the housing, and a first, diaphragm-shaped sealing member formed of an elastic material, having a through-opening, and likewise located in the housing.

2. Description of the Prior Art

Leadthroughs of the type discussed above are used for passing conduits such as, e.g., tubular conduits, cables or cable channels through constructional components such as, e.g., ceilings or walls.

The leadthroughs are embedded in the constructional components during their manufacturing. In particular, the leadthroughs can be cast in the concrete ceilings and walls. The leadthroughs are provided with an insert of an intumescent material, with the insert performing a fire-protection function. Thereby, a fire-protection is already available from the time of embedding or casting of a leadthrough in a constructional component, through installation of a conduit through the leadthrough, and up to finishing of a building.

In case of fire, in addition to flames having high temperatures, also flue gases are produced. The flue gases can penetrate, before the intumescent material is activated, into adjacent space through an annular slot between the conduit, which extends through the leadthrough, and the inner wall of the leadthrough housing.

European Publication EP 1 495 248 A1 discloses a leadthrough for passing conduits through a constructional component and having a circumferentially closed housing that surrounds a pass-through space for a conduit, an insert of intumescent material located in the housing, and a sealing member formed of an elastic material. The sealing member engages the conduit, which extends through the leadthrough, and seals the annular slot between the conduit and the inner wall of the housing against flue gases.

The drawback of the solution, which is proposed in the prior art, consists in that the hot flue gases, i.e., flue gases with high temperatures, which are generated during fire, melt the seal, which is provided by an elastomeric material, away before the intumescent mass is activated and closes the pass-through space of the housing. The hot flue gases can flow then through the annular slot, whereby burning-off of the side of the conduit adjacent to the constructional component and which was not expose to fire, is accelerated. If the conduit is melted away and the intumescent material has not yet completely expanded, the flue gases and flame, as the case may be, can reach unhindered the other side of the constructional component.

Accordingly, an object of the present invention is a leadthrough with which penetration of both cold and hot flue gases through the annular clearance between the conduit and the inner wall of the housing before activation of the intumescent material is reduced to a most possible extent.

SUMMARY OF THE INVENTION

This and other objects of the present invention, which will become apparent hereinafter are achieved by providing, in the leadthrough, a second diaphragm-shaped sealing element formed of a textile flat material, having a through-opening, also located in the housing, and having a transition temperature of at least 600° C.

The second sealing member provides, in the leadthrough, an additional sealing plane, so that the first sealing member of an elastic material provides a cold flue gas tightness and the second sealing member of a textile flat material provides a hot flue gas tightness and prevents passing of the hot flue gas through the clearance between the conduit and the inner wall of the housing to a most possible extent. As soon as the activation temperature of the insert of intumescent material is reached, the expending intumescent material completely closes the pass-through space of the housing. This prevents burning-off of the side of the conduit which is not exposed to fire.

Transition temperature is a temperature at which a textile flat material becomes brittle. Thus, the textile flat material is not burnt-off at temperatures which occur during a fire. During a fire, the brittle textile flat material, which became brittle as a result of fire, still prevents an unhindered penetration of hot flue gases through the annular clearance between the conduit which extends through the leadthrough, and the inner wall of the leadthrough housing.

The first sealing member of an elastic material is formed, e.g., as an annular member, with the inner diameter of the through-opening being somewhat smaller than the smallest outer diameter of a conduit passing through the leadthrough. Alternatively, the first sealing member can be formed as a disc-shaped member, on the through-opening of which a set break point is formed and which breaks upon passing of a conduit, enabling passing of the conduit through the first sealing member.

The through-opening of the second sealing member of a textile flat material has such dimensions that with a conduit extending therethrough, the second sealing member engages the outer diameter of the conduit.

Advantageously, the textile flat material has a thickness from 0.1 mm to 1 mm. This thickness insures a sufficient flexibility for a sealing engagement of the outer diameter of a conduit passing through the leadthrough. Preferably, the textile flat material has a thickness from 0.3 mm to 0.5 mm.

Advantageously, the textile flat material is a fiberglass fabric which is flexible, and the transition temperature of which can be more than 1,000° C. Such fabric becomes brittle during fire in advantageous way and seals the annular clearance in this condition in an advantageous manner. Alternatively, as a textile flat material, non-woven fabric or knitted fabric can be used.

Advantageously, the textile flat material is provided with a coating. The coating increases the sealing property of the additional sealing plane also against a cold flue gas.

Advantageously, the coating is formed of a polyurethane (PU) that upon being applied on the textile flat material, closes in advantageous manner, existing pores and openings in the textile flat material.

Advantageously, the through-opening of the second sealing member is formed of flexible lamellas formed by slots extending from a center of the through-opening radially outwardly.

Because the circumferential region of the through-opening of the second sealing member is resiliently deformable, the second sealing member easily adapts, despite being formed of a textile flat material, to the outer diameter of a conduit upon passing of the conduit through the leadthrough, and insures an advantageous sealing against hot flue gases.

Advantageously, the second sealing member is arranged adjacent to the first sealing member. Thus, both sealing members are arranged next to each other, insuring an advantageous flue gas tightness against cold and hot flue gases.

Advantageously, starting from a first end of the housing firstly, a first sealing member is arranged and then the second sealing member is arranged. This additionally improves the flue gas tightness of the leadthrough according to the present invention.

Advantageously, metallic lamellas are provided in the housing and extend from the housing radially in the pass-through space, the lamellas are resilient in an axial direction of the leadthrough and are arranged, starting from a first end of the housing, in front of the first sealing member. After a conduit has been passed through the leadthrough, the lamellas resiliently engage the outer diameter of the conduit. In case of fire, the spring force of the lamellas compresses the conduit, which becomes softer as a result of fire, and the pass-through space becomes mechanically closed. Thereby, the passing of the flue gas and, in particular, of the hot flue gas through the conduit or the pass-through space of the leadthrough is reduced up to the expansion of the intumescent material.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show.

DETAILED DESCRIPTION OF THE PREFERRED EMBODIMENT

Figure 1:
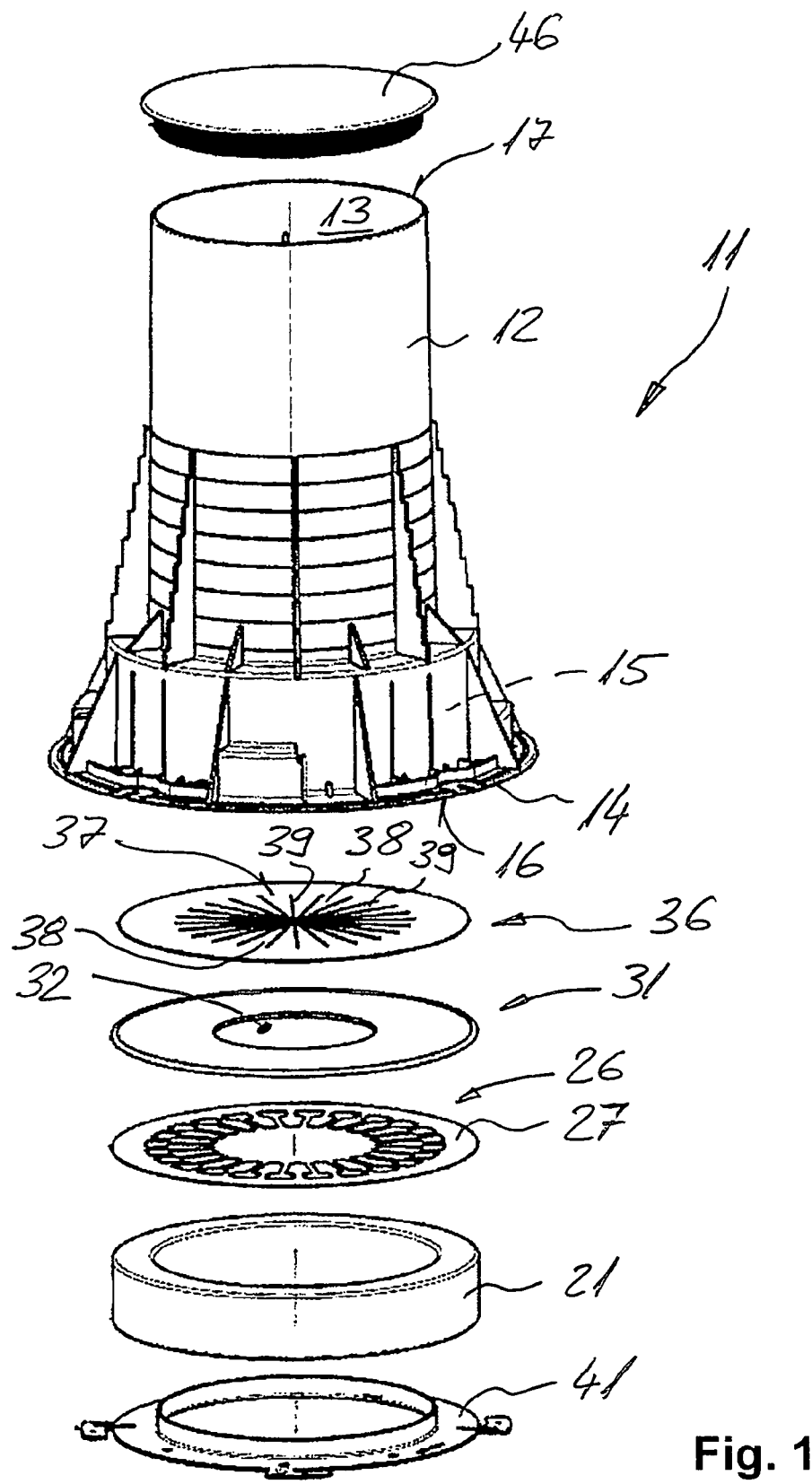
FIG. 1 an exploded view of a leadthrough according to the present invention.
Figure 2:
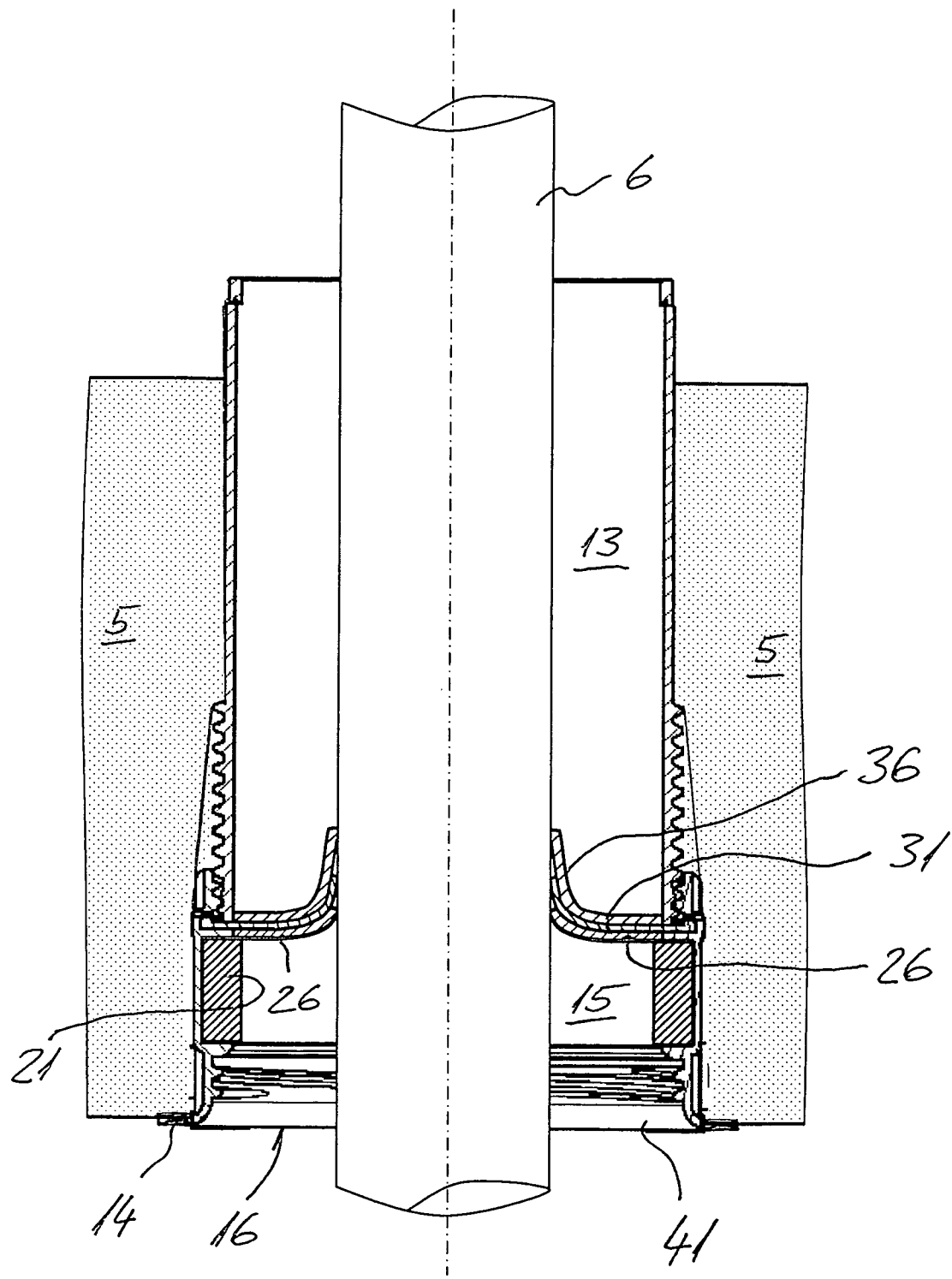
FIG. 2 a longitudinal cross-sectional view of a leadthrough according to the present invention in its mounted condition.

A leadthrough 11 according to the present invention for passing a conduit 6 such as a pipe through a constructional component 5 formed e.g., as a ceiling and which is shown in FIGS. 1-2, includes a circumferentially closed tubular housing 12 that surrounds a pass-through space 13 for the conduit 6. At its first end 16, the housing 12 is provided with a flange 14 that projects radially outwardly, and an adjoining the flange 14, receiving chamber 15 for an annular insert 21 formed of an intumescent material.

Proceeding from the first end 16 of the housing 12, adjoining the insert 21, there are provided in the housing 12, metallic lamellas 26 which extend substantially radially from the housing 12 and into the pass-through space 13 and which are formed resilient in the axial direction. The metallic lamellas 26 are stamped, e.g., from spring steel and are supported on an annular support 27, being formed integrally therewith. The lamellas 26 are followed by a first, diaphragm-shaped, sealing member 31 with a through-opening 32 and which is formed of an elastic material. The first sealing member 31 is formed as an annular member of a rubber material.

Adjoining the first sealing member 31, closely adjacent thereto, there is provided, in the housing 12, a second, diaphragm-shaped sealing member 36 having a through-opening 37. The second sealing member 36 is formed of a textile flat material. The non-flammable textile flat material, which is used for making the second sealing member 36, is a fiberglass fabric having a thickness from 0.1 mm to 1 mm. The textile flat material is further covered with polyurethane (PU). The pass-through opening 37 of the second sealing member 36 is formed by flexible lamellas 38 which are formed by slots 39 extending radially outwardly from the center of the pass-through opening 37.

The second sealing member 36, the first sealing member 31, the metallic lamellas 26, and the insert 21 of an intumescent material are located, in an assembled condition of the leadthrough 11, in the receiving chamber 15 and are secured, with no possibility of displacement, in the receiving chamber 15 of the housing 12 with an annular cover plate 41.

In order to provide a pass-through in a cast constructional component 5, the leadthrough 11 is secured on the formwork of the constructional component 5. To this end, the radially projecting flange 14 of the housing 12 is advantageously provided with nail holes (not shown). At the second end 17 of the housing 12, a closure cover 46 is provided. The closure cover 46 prevents penetration of concrete into the receiving chamber 15 during casting of the constructional component 5. After the constructional component 5 hardens, the leadthrough 11 is fixed therein.

When the conduit 6 is passed through the leadthrough 11, the lamellas 26 resiliently engage, and both the first and second sealing members 31 and 36 sealingly engage the outer diameter of the conduit 6 (see FIG. 2). The leadthrough 11 enables an advantageous fire protection of the leadthrough, together with an advantageous cold and hot flue gas tightness.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A leadthrough for passing conduits (6) through a constructional component (5), comprising a circumferentially closed housing (12) that surrounds a pass-through space (13) for a conduit (6); an insert (21) of intumescent material located in the housing (12); a first, diaphragm-shaped sealing member (31) formed of an elastic material, having a through-opening (32), and likewise located in the housing (12); and a second, diaphragm-shaped sealing element formed of a textile flat material, having a through-opening (37), also located in the housing (12), and having a transition temperature of at least 600° C., wherein the textile flat material is provided with a coating.

2. A leadthrough according to claim 1, wherein the textile flat material has a thickness from 0.1 mm to 1 mm.

3. A leadthrough according to claim 1, wherein the textile flat material is a fiberglass fabric.

4. A leadthrough according to claim 1, wherein the coating is formed of polyurethane (PU).

5. A leadthough according to claim 1, wherein the through-opening (37) of the second sealing member (36) is formed of flexible lamellas (38) formed by slots (39) extending form a center of the through-opening (37) radially outwardly.

6. A leadthrough according to claim 1, wherein the second sealing member (36) is located adjacent to the first sealing member (31).

7. A leadthrough according to claim 1, wherein starting from a first end (16) of the housing (12), firstly a first sealing member (31) is arranged and then the second sealing member (36) is arranged.

8. A leadthrough for passing conduits (6) through a constructional component (5), comprising a circumferentially closed housing (12) that surrounds a pass-through space (13) for a conduit (6); an insert (21) of intumescent material located in the housing (12); a first, diaphragm-shaped sealing member (31) formed of an elastic material, having a through-opening (32), and likewise located in the housing (12); a second, diaphragm-shaped sealing element formed of a textile flat material, having a through-opening (37), also located in the housing (12), and having a transition temperature of at least 600° C.; and metallic lamellas (26) provided in the housing (12) and extending from the housing (12) radially in the pass-through space (13), the lamellas (26) being resilient in an axial direction of the leadthrough and being arranged, starting from a first end of the housing (12), in front of the first sealing member (31).

* * * * *